US009805477B2

(12) United States Patent
Morand et al.

(10) Patent No.: US 9,805,477 B2
(45) Date of Patent: Oct. 31, 2017

(54) DISPLAY MANAGEMENT METHOD AND ASSOCIATED COMPUTER PROGRAM PRODUCT AND ELECTRONIC DEVICE

(71) Applicant: Schneider Electric Industries SAS, Rueil Malmaison (FR)

(72) Inventors: Denis Morand, Chateauneuf Villevieille (FR); Tewfik Meftah, Grenoble (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/015,499

(22) Filed: Feb. 4, 2016

(65) Prior Publication Data
US 2016/0232687 A1 Aug. 11, 2016

(30) Foreign Application Priority Data
Feb. 5, 2015 (FR) ...................................... 15 50907

(51) Int. Cl.
*G06T 11/00* (2006.01)
*G06T 19/00* (2011.01)
(Continued)

(52) U.S. Cl.
CPC .......... *G06T 11/00* (2013.01); *G06F 3/04842* (2013.01); *G06T 19/003* (2013.01);
(Continued)

(58) Field of Classification Search
CPC ................... G06T 11/00; G06T 19/003; G06T 2207/20101; G06F 3/04842; G05B 2219/32014; G05B 19/4069; G06Q 10/06
See application file for complete search history.

(56) References Cited

U.S. PATENT DOCUMENTS

2010/0063754 A1* 3/2010 Thomas ............... G01R 31/086
702/59
2011/0115816 A1 5/2011 Brackney

FOREIGN PATENT DOCUMENTS

FR 2 990 286 A1 11/2013
FR WO 2013167523 A1 * 11/2013 ........... G06T 7/0042

OTHER PUBLICATIONS

French Preliminary Search Report dated Dec. 22, 2015 in French Application 15 50907, filed Feb. 5, 2015 (with English Translation of Categories of Cited Documents and Written Opinion).

(Continued)

*Primary Examiner* — Jwalant Amin
(74) *Attorney, Agent, or Firm* — Oblon, McClelland, Maier & Neustadt, L.L.P.

(57) ABSTRACT

A method for managing the display on a screen of an electronic device of at least one item of information relating to an apparatus. The method includes providing an enriched image of the apparatus, including an image of the apparatus and interest points of the apparatus, choosing at least one interest point from among the plurality of interest points, for obtaining a set of chosen interest points, selecting information to be displayed, providing a set of diagrams of the apparatus available for the apparatus, optimizing, according to a predefined criterion, each diagram of the apparatus available by inserting into the diagram of the apparatus a preview of information to be displayed for obtaining an enriched schematic representation, and classifying the enriched schematic representations according to the predefined criterion.

11 Claims, 6 Drawing Sheets

(51) Int. Cl.
*G06F 3/0484* (2013.01)
*G05B 19/4069* (2006.01)
*G06Q 10/06* (2012.01)

(52) U.S. Cl.
CPC .............. *G05B 19/4069* (2013.01); *G05B 2219/32014* (2013.01); *G06Q 10/06* (2013.01); *G06T 2207/20101* (2013.01)

(56) References Cited

OTHER PUBLICATIONS

Sanghoon Lee et al. "Augmented Reality-Based Computational Fieldwork Support for Equipment Operations and Maintenance", Automation in Construction, vol. 20, 2011, 15 pages.

Hugo Alvarez et al. "Providing Guidance for Maintenance Operations Using Automatic Markerless Augmented Reality System", 2011 10th IEEE International Symposium on Mixed and Augmented Reality (ISMAR), Oct. 26-29, 2011, 10 pages.

* cited by examiner

DISPLAY MANAGEMENT METHOD AND ASSOCIATED COMPUTER PROGRAM PRODUCT AND ELECTRONIC DEVICE

The present invention relates to a method for managing the display, on a screen of an electronic device, of at least one item of information relating to a piece of equipment or apparatus. The invention also relates to a computer program product implementing such a method and an electronic device implementing such a computer program product.

In multiple industrial fields, it is known to superimpose a virtual model on an image of a piece of industrial equipment or apparatus acquired by an electronic device. Such a superimposition is displayable on a screen of the electronic device in the form of a new image on which information relating to the industrial apparatus has been superimposed or associated therewith. Such an image is thus termed an enriched image. Such a display method is generally known under the name of augmented reality.

In this regard, for example, document FR-A-2 990 286 discloses interest points indicating components of the apparatus for which an item of information exists. The document also reveals the possibility of positioning the interest points on the image acquired with respect to the components of the apparatus.

The following documents are also known: document US-A-2011/0115816, as well as articles written by Sanghoon Lee et al: <<Augmented reality-based computational fieldwork support for equipment operations and maintenance>>, Automation In Construction, vol. 20, no. 4, 4 Nov. 2010, pages 338-352, DOI: 10.1016/J.AUTCON.2010.11.004, and by Hugo Alvarez et al: <<Providing guidance for maintenance operations using automatic markerless Augmented Reality system>>, 10TH IEEE International Symposium On Mixed And Augmented Reality, 26th Oct. 2011, pages 181-190, DOI: 10.1109/ISMAR.2011.6092385.

It is also known to pass from a display mode in augmented reality to an enumeration of the components and information identified on the enriched image. In such an approach, information is simply drawn up in list form. However, no visual representation of the industrial apparatus considered is provided, which does not facilitate taking into account and analysing the data displayed.

There is a need for a display management method that facilitates accessing information relevant to a user.

For this purpose, the subject matter of the invention is a method for managing the display on a screen of an electronic device of at least one item of information relating to an apparatus, the method comprising the following steps:
  a) the provision of an enriched image of the apparatus, comprising an image of the apparatus and interest points of the apparatus, each interest point being associated with an item of information specific to an element of the apparatus,
  b) the choice of at least one interest point from among the plurality of interest points, for obtaining a set of chosen interest points,
  c) the selection of information to be displayed, information to be displayed being information associated with the chosen interest points,
  d) the provision of a set of diagrams of the apparatus available for the apparatus,
  e) the optimisation, according to a predefined criterion, of each diagram of the apparatus available by inserting into the diagram of the apparatus a preview of information to be displayed, the preview being compatible with the diagram, for obtaining an enriched schematic representation comprising a diagram of the apparatus and at least one preview of one of the items of information to be displayed, and
  f) the classification of the enriched schematic representations according to the predefined criterion.

Thanks to the invention, the display management method provides at least one enriched schematic representation of information identified on the apparatus. Such a representation is notably more schematic and therefore offers a simplified approach to an analysis of the identified information.

According to advantageous but not mandatory aspects of the invention, such a display management method includes one or more of the following features, taken according to all the technically acceptable combinations:
  The method further comprises a step g) of selecting data, the data not being information associated with the chosen interest points and the data being accessible for the electronic device, information to be displayed also including the selected data.
  The selected data originate from at least one sensor of the electronic device.
  Step e) of optimisation includes an ordering of information to be displayed in the form of a lattice.
  Step e) of optimisation includes the use of selection filters.
  Step e) of optimisation includes the use of an associative array associating with each interest point the unique preview of information with which the interest point is associated.
  The method further comprises a step h), of displaying enriched schematic representations ordered according to the value of the predefined criterion.
  The method further comprises a display of the enriched schematic representation presenting the highest value of the predefined criterion.
  At least one step is triggered by an action of a user.
  The users action is a rotation of the electronic device about an axis perpendicular to their screen and the electronic device comprises at least one actuation button or touch button and the user's action is pressing the actuation button or the touch button.

The subject matter of the invention is also a computer program product comprising software instructions which, when implemented by an information processing unit incorporated in an electronic device, implements a method as described above.

The subject matter of the invention is also an electronic device including a detector, a set of sensors, a screen, a unit for displaying data on the screen and an information processing unit on which a computer program product as previously described is implemented The invention will be better understood and other advantages thereof will appear more clearly in the light of the following description, given solely as a non-restrictive example with reference to the appended drawings, in which.

Figure 1:
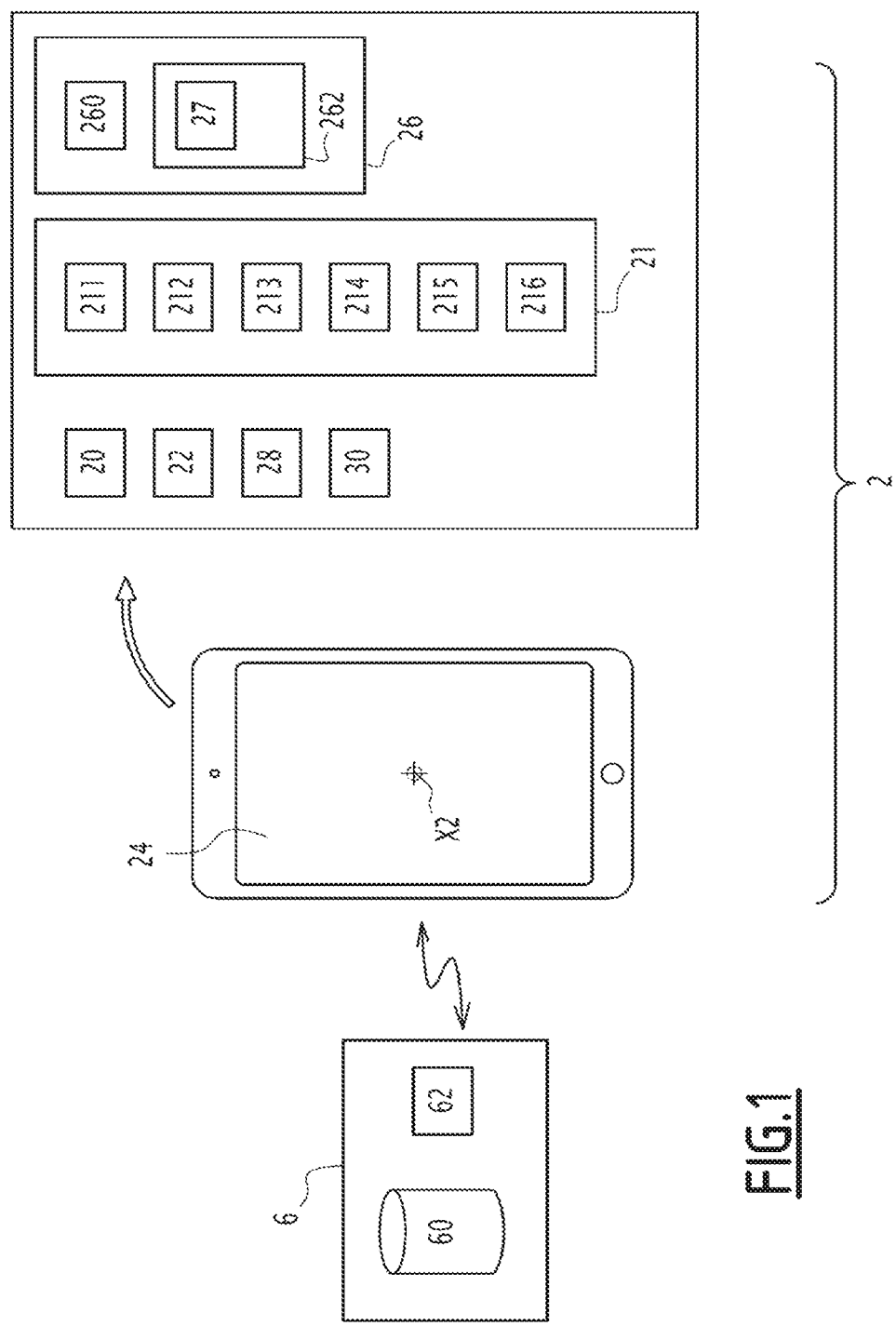
FIG. 1 is a schematic representation of an example of an electronic device.
Figure 2:
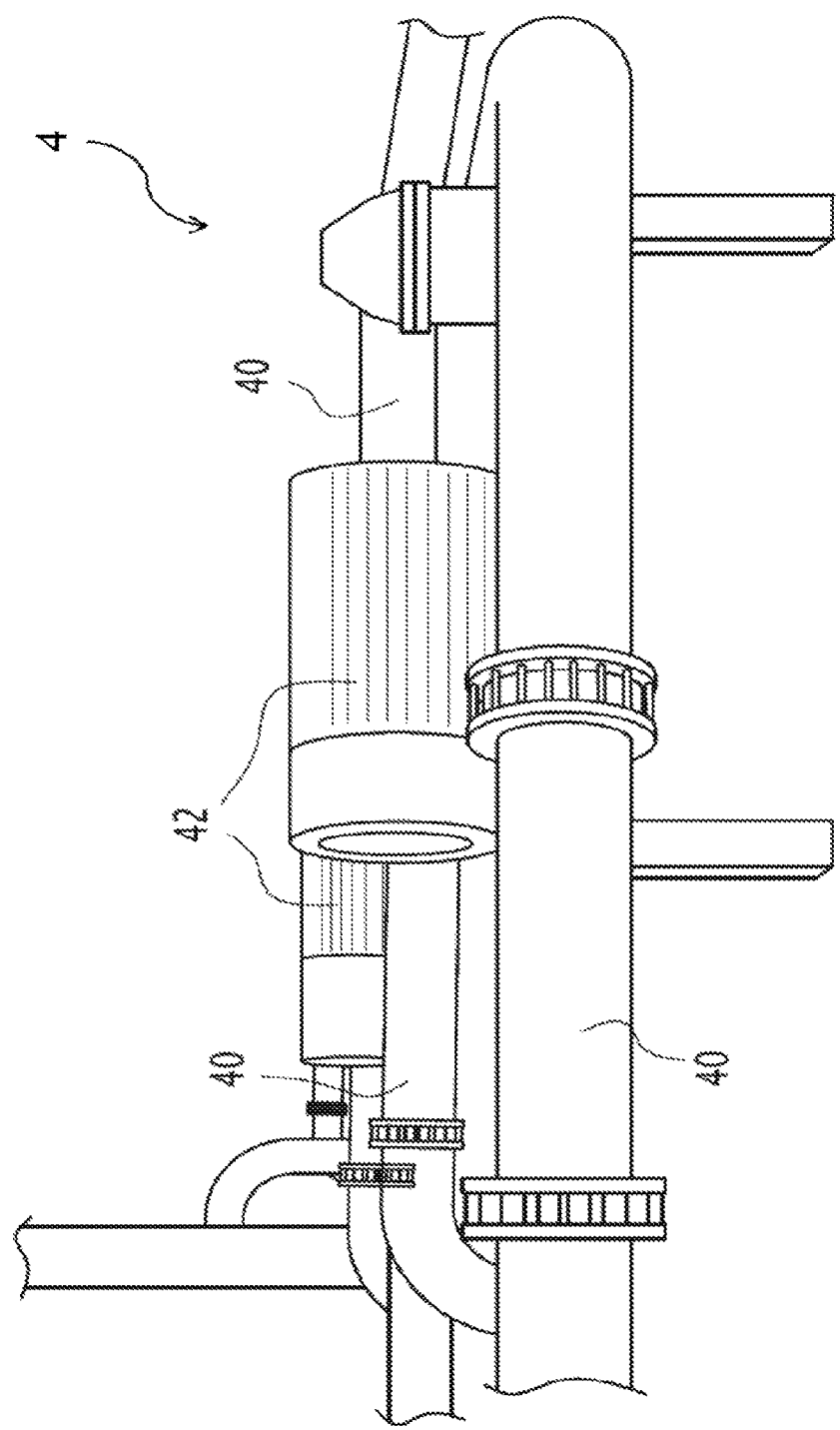
FIG. 2 is a schematic view of an example of apparatus.

An electronic device 2 and an apparatus 4 are respectively represented in FIGS. 1 and 2.

The electronic device 2 is intended for a user.

The electronic device 2 is, preferably, a portable electronic device, e.g. a mobile phone, or an electronic tablet.

As a variant, the electronic device 2 is a computer.

The electronic device 2 is capable of implementing a computer program product that comprises software instructions for executing a display management method.

The electronic device 2 includes a detector 20, a set of sensors 21, a display unit 22, a screen 24, an information processing unit 26, a transceiver 28 and a power supply unit 30.

The detector 20 is, for example, an image sensor suitable for acquiring one or more successive images of the apparatus 4.

For example, the detector 20 is a matrix sensor, such as a CCD (Charge-Coupled Device) sensor or a CMOS (Complementary Metal Oxide Semi-conductor) sensor.

The detector 20 is suitable for delivering to the processing unit 26 an acquired image $I_a$ of the apparatus 4, or for providing a video of successive images of said apparatus 4.

The set of sensors 21 includes, for example, a geopositioning unit 211, an accelerometer 212, a gyroscope 213, a touch sensor 214, an eye movement sensor 215 and a microphone 216.

As a variant, the set of sensors 21 comprises any combination of the previously mentioned sensors.

According to yet another variant, the set of sensors 21 comprises other sensors for allowing access to other information that may be of interest to the user.

The geopositioning unit 211, the accelerometer 212 and the gyroscope 213 are suitable for providing position data for the electronic device 2. The position data relating to the electronic device 2 are denoted as data D2 in the rest of the description.

The geopositioning unit 211 is, for example, configured for being in communication with a geopositioning system, e.g. an indoor positioning system or an outdoor positioning system, such as the GPS system (Global Positioning System) which is known per se.

The accelerometer 212 is used to measure the acceleration of the electronic device 2 in at least one direction. According to one variant, the accelerometer 212 comprises a plurality of sensors for measuring the acceleration of the electronic device 2 in three separate directions.

The gyroscope 213 is used to measure the rotation of the electronic device 2 along at least one axis. According to one variant, the gyroscope 213 comprises a plurality of sensors for measuring the rotation of the electronic device 2 along three separate axes.

The touch sensor 214, the eye movement sensor 215 and the microphone 216 are suitable for transmitting to the processing unit 26 at least one item of information relating to a user's command.

The touch sensor 214 is arranged below the screen 24, so that the screen 24 is a touch screen capable of displaying touch buttons and/or a touch keyboard.

The eye movement sensor 215 is, for example, an oculometer which makes it possible to follow the user's eye movements.

The microphone 216 is used to record the user's voice.

The display unit 22 is capable of displaying data on the screen 24. In particular, the display unit 22 is suitable for displaying any type of image on the screen 24 of the electronic device 2, notably the image $I_a$ acquired by the detector 20 or an image acquired and then modified by the processing unit 26. The display unit 22 is, for example, a software program or a graphics card for displaying the image $I_a$ on the screen 24.

The screen 24 is configured for displaying one or more successive images, notably in interaction with the detector 20 and/or the display unit 22.

For the remainder of the description, the axis perpendicular to the surface of the screen 24 is denoted as the normal axis X2.

The screen 24 has dimensions allowing easy viewing of the acquired image $I_a$, such as a diagonal with a length greater than five inches, preferably greater than seven inches, preferably still greater than nine inches.

The processing unit 26 is suitable for the computer processing of information. In particular, the processing unit 26 is suitable for implementing modifications, conversions and analyses on the acquired image $I_a$.

The processing unit 26 comprises a processor 260 and a memory 262 associated with the processor 260.

The processor 260 is capable of implementing one or more software instructions stored in the memory 262.

The memory 262 of the processing unit 26 of the electronic device 2 is capable of storing data, as well as a computer program product 27.

The data stored by the memory 262 are, for example, data D4 concerning the apparatus 4 and recorded in the form of files, numeric values and/or text values. The data stored by the memory 262 may also be the position data D2 of the electronic device 2 provided by the set of sensors 21.

The computer program product 27 comprises software instructions which, when they are implemented by the processing unit 26, implement a method of displaying an item of information I4 relating to the apparatus 4.

Figure 3:
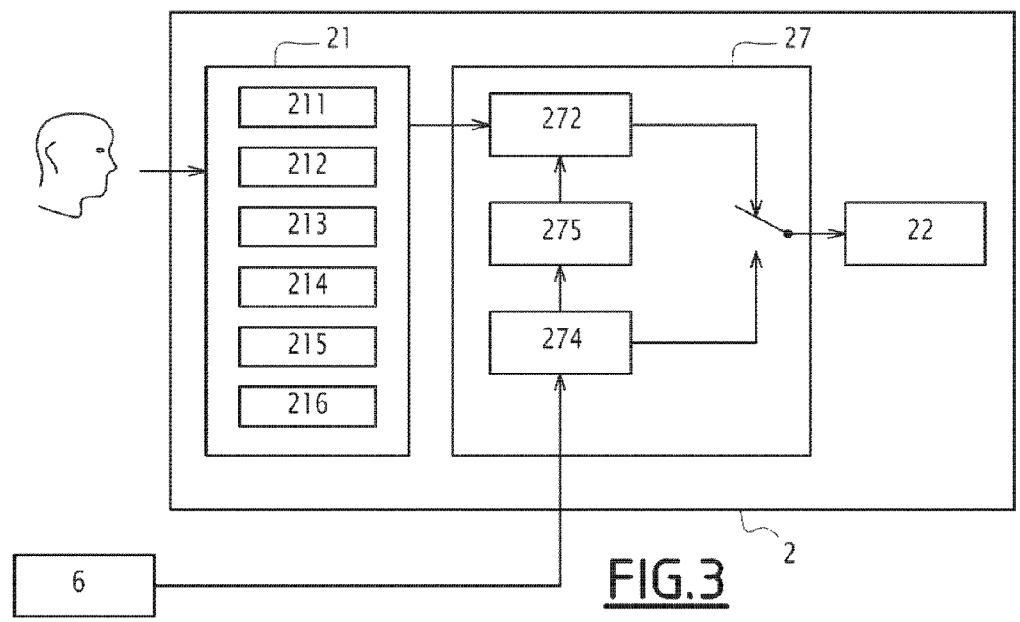
FIG. 3 is a schematic view of the electronic device of FIG. 1 and an example of a computer program product.

As can be seen in FIG. 3, the computer program product 27 comprises a first software instruction 272, a second software instruction 274 and a third software instruction 275.

The first software instruction 272 is, for example, a software instruction to display in augmented reality.

The first augmented reality software instruction 272 is capable of providing an enriched image $I_e$ of the apparatus 4 by association with the acquired image $I_a$ of a plurality of interest points P. Each interest point P indicates an element of the apparatus 4 and is associated with an item of information $I_P$ specific to the element in question. An interest point P is, for example, an item of digital data $D_P$, such as a text value, a measurement value, an image, a graphical widget (a graphical interface component, a visual element of a graphical interface, or a button, a scrollbar, a drop-down list, etc.), a hypertext link or any other relevant data for display in augmented reality.

The second software instruction 274 is, for example, a software instruction to display in conventional mode.

The second software instruction 274 is capable of providing an enriched schematic representation $R_e$ of the enriched image $I_e$ of the apparatus 4.

The enriched schematic representation $R_e$ is, for example, a drawing, a graph, a model, a man-machine interface or a mimic diagram, such as a SCADA (Supervisory Control And Data Acquisition) mimic diagram. The enriched schematic representation $R_e$ includes a plurality of objects O.

As a variant, in the event that the enriched schematic representation $R_e$ is a man-machine interface or a mimic diagram, it may also not comprise objects O.

Each object O indicates an element of the apparatus 4 and is associated with the respective interest point P of the enriched image $I_e$. Accordingly, each object O is associated with an item of information $I_O$ specific to the element in question.

An object O is, for example, an item of digital data $D_O$, such as a text value, a measurement value, an image, a hypertext link or any other relevant data for the display in conventional mode.

Figure 4:
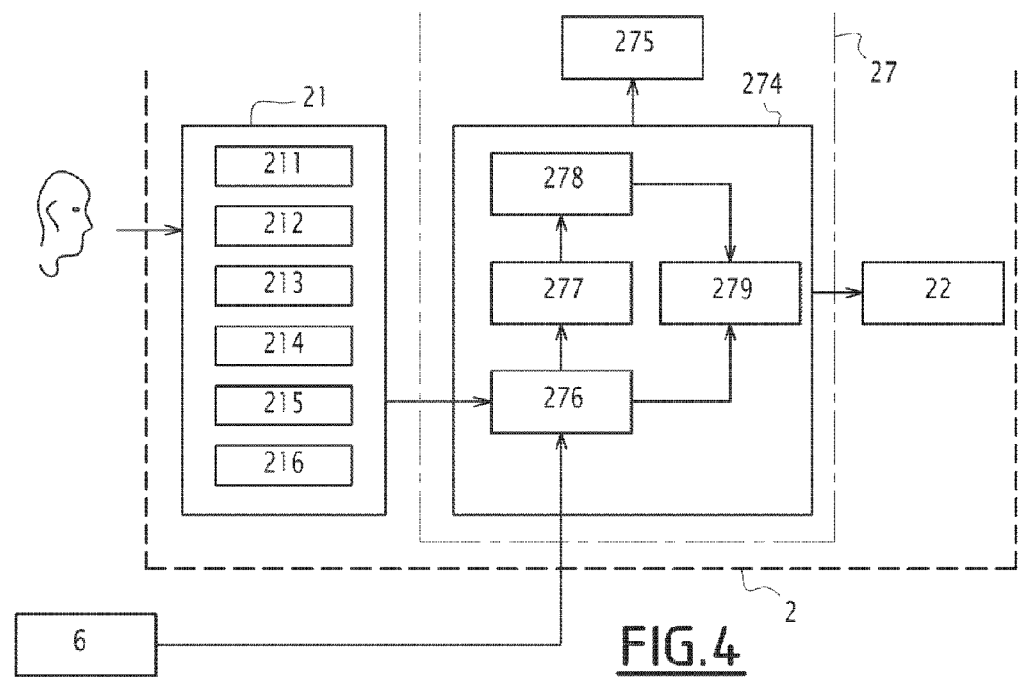
FIG. 4 is a detailed schematic view of the computer program product represented in FIG. 3.

As can be seen in FIG. 4, the second software instruction 274 comprises a selection software instruction 276, a preparation software instruction 277, a classification software instruction 278 and a preview software instruction 279.

The selection software instruction 276 is configured for retrieving information $I_P$ associated with the interest points P to be displayed.

The preparation software instruction 277 is capable of providing a set of diagrams of the apparatus 4.

A diagram of the apparatus 4 is a two-dimensional or three-dimensional view describing the apparatus 4. Each diagram comprises a preview of information I4 to be displayed.

The preparation software instruction 277 is also capable of optimising each diagram of the apparatus 4, according to a predefined criterion C, in order to obtain the enriched schematic representation $R_e$.

The predefined criterion C is, for example, chosen by the user. The predefined criterion C then represents a command, expressed by the user, concerning the enriched schematic representations $R_e$. The predefined criterion C may then be 'the diagram presenting the most interest points P' or 'the diagram presenting the interest points P with the most information to be displayed'. Other criteria C may be considered by the user.

The classification software instruction 278 is configured for classifying, or ordering, according to the same criterion C, the enriched schematic representations $R_e$.

The preview software instruction 279 is capable of displaying the enriched schematic representation $R_e$ presenting the highest value of the predefined criterion C.

As a variant, the preview software instruction 279 is capable of displaying the enriched schematic representation $R_e$ selected by the user.

The third software instruction 275 is an execution software instruction configured for associating an interest point P of the enriched image $I_e$ with each object O of the enriched schematic representation $R_e$. The third software instruction 275 is controlled by the second software instruction 274.

The transceiver 28 is, for example, an antenna. The antenna 28 is configured for establishing two-way radio communications between the electronic device 2 and at least one unit external to the electronic device 2. Such an external unit is capable of communicating information I4 concerning the apparatus 4.

The external unit is, for example, a server 6 positioned elsewhere from the apparatus 4, also called a remote server. The server 6 is notably represented in FIG. 1.

As a variant, the server 6 is positioned in the vicinity of the apparatus 4, e.g. in such a way that a local area network connects the server 6 to the apparatus 4.

As a further variant, multiple external units are capable of communicating information I4 concerning the apparatus 4. The external units are, for example, remote and/or local servers.

The power supply unit 30 is configured for supplying electrical energy to the detector 20, the set of sensors 21, the display unit 22, the screen 24, the processing unit 26 and the transceiver 28.

The power supply unit 30 is, for example, an electric battery. Such a battery is, preferably, rechargeable.

The apparatus 4 is, for example, a pumping station. The pumping station 4 includes pipes 40, pumps 42, electric motors, sensors (not represented) and protective cabinets (not represented) including variable speed drives, controllers and actuators.

The server 6 comprises a database 60 and a unit 62 for transmitting data to the electronic device 2.

The database 60 is suitable for storing data D4 relating to the apparatus 4, notably data relating to the status and operation of each pipe 40, pump 42 and other components not represented in the figures. The stored data D4 are, for example, the electrical power consumed by each electric motor, the temperature of each pipe 40, the pressure of each pump 42, as well as the presence or absence of an operating fault for each of the components.

In addition, the stored data D4 are displayed in the form of an enriched schematic representation $R_e$, such as a SCADA mimic diagram, a man-machine interface or an Internet page.

The transmitting unit 62 is configured for sending the data D4 relating to the apparatus 4, stored in the database 60, to the electronic device 2.

The operation of the electrical device 2 and the computer program product 27 is explained in the description that follows of an example of implementation of a display method.

As described hereafter, each step of the display management method is triggered by a user's action. The user's action is, for example, a rotation of the electronic device 2 about the normal axis X2 or pressing an actuation button of the electronic device 2 or pressing a touch button on the screen 24, with the aid of the touch sensor 214.

Figure 5:
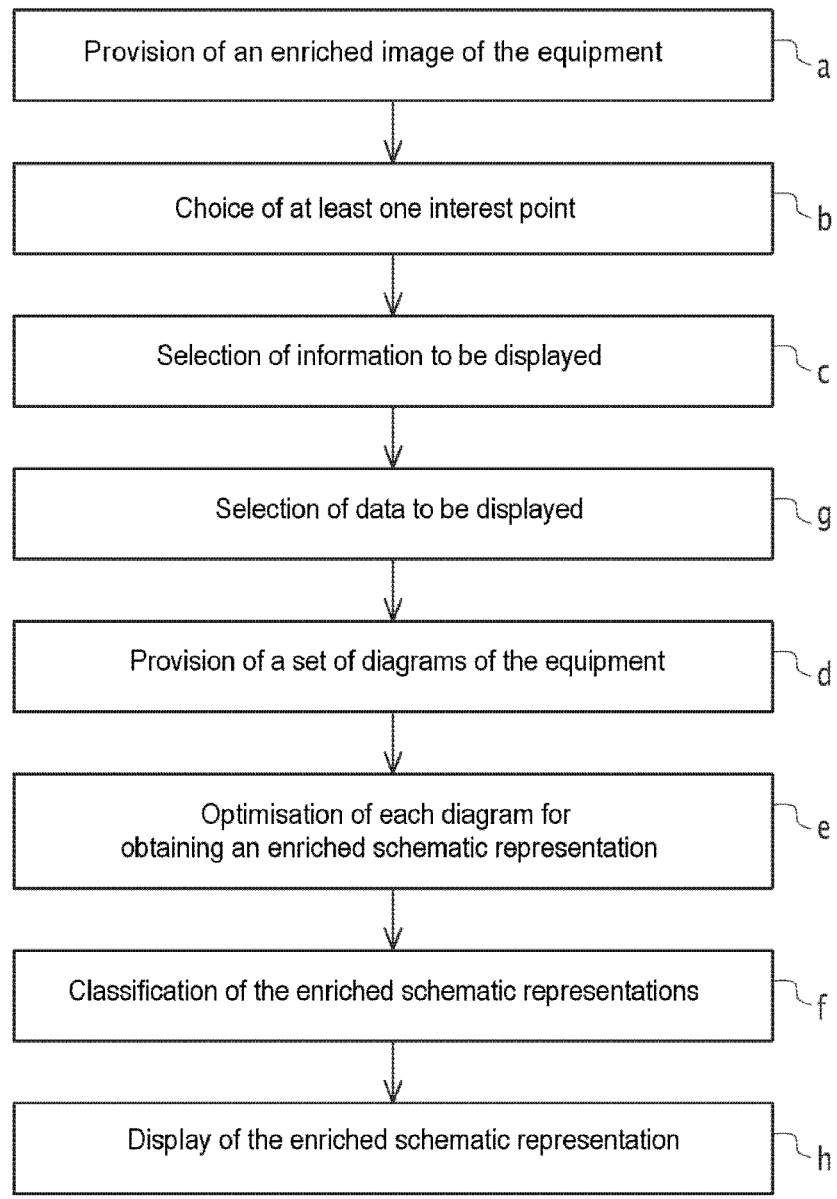
FIG. 5 is a flow chart of an example of a display management method.

The user uses the electronic device 2 for extracting a plurality of information concerning the apparatus 4. The computer program product 27 is then launched on the electronic device 2 by the user. The product 27 implements the display management method. Such a method comprises multiple steps, as shown in FIG. 5 and as explained in the description that follows.

The display method comprises a first step a) of providing an enriched image $I_e$ of the apparatus 4 comprising an acquired image $I_a$ of the apparatus 4 and interest points P of the apparatus 4.

Step a) is implemented by the processing unit 26.

As a variant, in step a), an enriched image $I_e$ of the apparatus 4 is provided to the processing unit 26 then the processing unit 26 analyses the interest points P. Such an analysis is performed dynamically when the mode is changed or statically, notably after the screen 24 is frozen.

In particular, during step a), the processing unit 26 launches the first software instruction 272.

According to one embodiment, the electronic device 2 identifies the apparatus 4 by geopositioning. The electronic device 2 calculates, using the geopositioning unit 211, the coordinates of the apparatus 4 together with the orientation of the apparatus 4. By way of example, the calculated coordinates are GPS coordinates. Then, the electronic device 2, via its antenna 28, establishes a radio communication with the database 60 of the server 6, through the transmitting unit 62.

The GPS coordinates and the orientation of the electronic device 2 are then sent to the server 6 which identifies the apparatus 4.

As a variant, the apparatus 4 is identified by recognition of an image of the apparatus 4. In other words, the electronic device 2 acquires an image $I_a$, or a succession of images, of the apparatus 4, using the detector 20. The image or images are then sent to the server 6 which identifies the apparatus 4.

As a further variant, the apparatus 4 is identified using a unique code present on the apparatus 4. The unique code is, for example, a two-dimensional identification code, a bar code, an identifying image or symbol, a QR (Quick Response) code, also called matrix code, or any other means allowing the unequivocal identification of the apparatus 4. In other words, the electronic device 2 acquires an image of the unique code using the detector 20 which is then sent to the server 6 for identifying the apparatus 4.

When the server 6 has identified the apparatus 4, the server 6 sends the electronic device 2 information $I_P$ relating to the interest points P which are present on the identified apparatus 4. The plurality of interest points P is then displayed by the display unit 22 on the acquired image $I_a$ which becomes the enriched image $I_e$. As explained above, each interest point P is associated with an item of information $I_P$ specific to an element of apparatus 4, which the user may access.

As a variant, in step (a), a succession of enriched images is provided, e.g. a video, of the apparatus 4 comprising a succession of acquired images of the apparatus 4 and interest points P of the apparatus 4. The apparatus 4 is then identified as explained previously. In particular, when the server 6 has sent information $I_P$ relating to the interest points P, the plurality of interest points P is displayed by the display unit 22 on the succession of acquired images which become the succession of enriched images.

Figure 6:
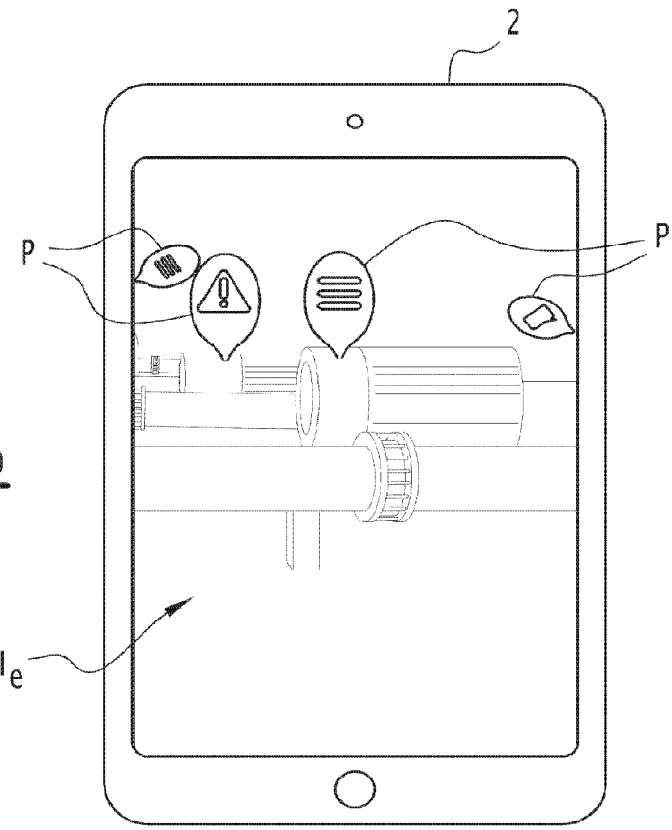
FIG. 6 is a schematic view of the result obtained after provision of an enriched image of the apparatus in FIG. 2.

At the conclusion of step a), the computer program product 27 has provided a view of the apparatus 4 in augmented reality. For example, as represented in FIG. 6, the enriched image $I_e$ is displayed on the screen 24 of the electronic device 2, with the aid of the display unit 22. The enriched image $I_e$ comprises the acquired image $I_a$ of a part of the apparatus 4 and the interest points P which have been identified on such part of the apparatus 4. In particular, two pumps 42, pipes 40 and four interest points P are visible on the enriched image $I_e$. In this case, the interest points P are a fault message, two messages including measurements made by the sensors of the apparatus 4 and a text message relating to the operation of a component of the apparatus 4.

Figure 7:
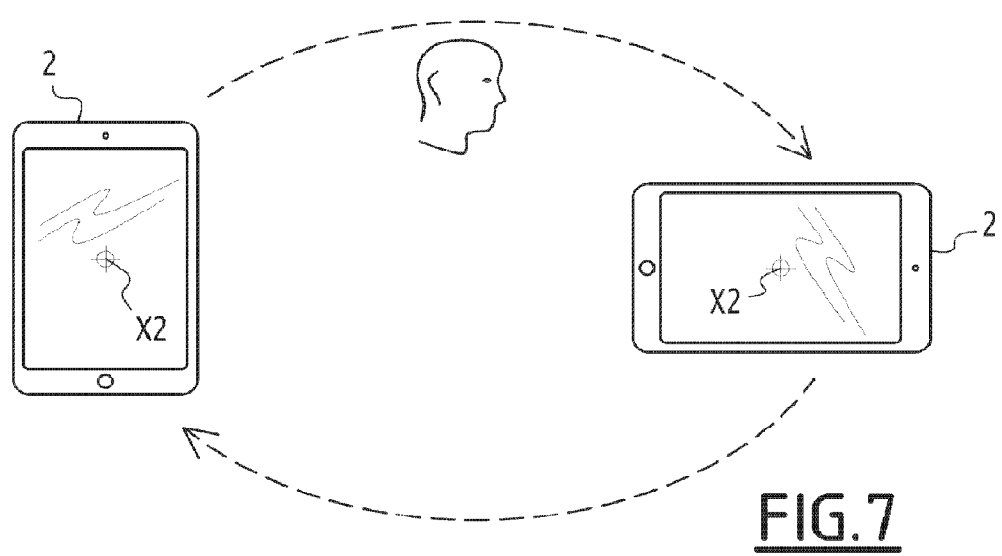
FIG. 7 is a schematic view of an action of a user.

However, the user wishes to change from the view in augmented reality to a view in conventional mode. To do this, the user rotates the electronic device 2, e.g. by 90 degrees, about the normal axis X2, as represented in FIG. 7. Such an action of the user launches the third software instruction 274.

The method then comprises a step b) of choosing at least one interest point P from among the plurality of interest points P, for obtaining a set of chosen interest points.

Step b) of choosing is implemented by the user in interaction with the electronic device 2.

In particular, the user selects the interest points P that the user wishes to keep. For example, referring to FIG. 6, the user chooses the interest points P relating to the fault message and to the messages with measurements. Such a user choice may be performed manually, e.g. using the touch sensor 214 on the screen 24 or using the microphone 216 for voice recognition or via any other means of manual selection, or automatically, e.g. by selecting an area of the screen 24 which contains interest points P or any other means of automatic selection.

At the conclusion of step b), the user obtains the set of interest points P which correspond to the most relevant or interesting elements of the apparatus 4.

The method then comprises a step c) of selecting information to be displayed, information to be displayed being information $I_P$ associated with the chosen interest points.

Step c) is implemented by the selection software instruction 276. More precisely, the software instruction 276 retrieves from the server 6, information $I_P$ associated with the chosen interest points P. For example, referring to FIG. 6, the selection software instruction 276 retrieves from the server 6 information $I_P$ concerning a fault and measurements performed on the element of the apparatus 4 in question. By way of illustration, information $I_P$ relates to the pressure of each of the pipes 40.

The method then comprises a step g) of selecting data. The data selected in step g) are intended to be displayed.

Step g) is implemented by the selection software instruction 276.

Generally speaking, in step g) the user completes the selection of step c) with other requests for information that the user deems relevant. Such additional sources of information result from or are generated by the electronic device 2. By way of example, the data consist of GPS coordinates, data extracted from files, numeric value inputs or text data. Alternatively or additionally, the data are sought by the electronic device 2 by means of remote access and retrieval of data on one or more remote servers.

Thus, the data are not information $I_P$ associated with the chosen interest points P but are data accessible to the electronic device 2. Such access to data is generally made possible by the selection software instruction 276.

More precisely, according to the example illustrated, the selection software instruction 276 retrieves the data from the detector 20 and the set of sensors 21.

For example, the selection software instruction 276 retrieves the position data D2 of the electronic device 2.

The selection software instruction 276 also retrieves the data D4 relating to the apparatus 4 from the memory 262 of the processing unit 26. As a reminder, the data D4 are numeric and text values concerning the apparatus 4.

For example, referring to FIG. 6, the selection software instruction 276 retrieves an image from the detector 20 and a list of corrective actions to be performed for correcting the fault from the memory 262. At the conclusion of step g), information to be displayed includes information $I_P$ retrieved in step c) and the data retrieved in step g).

The method then comprises a step d) of providing a set of diagrams of the apparatus 4 available for the apparatus 4.

As a variant, one diagram only is available for the apparatus 4.

For example, the preparation software instruction 277 provides a list of available diagrams including a two-dimensional diagram, a three-dimensional diagram, etc.

Step d) is implemented by the preparation software instruction 277 of the software instruction to display in conventional mode 274.

At the conclusion of step d), a set of diagrams is thus obtained for the apparatus 4. These diagrams do not comprise information to be displayed.

The method then comprises a step e) of optimising each diagram of the apparatus 4 available for obtaining an enriched schematic representation $R_e$. Step e) of optimisation is implemented by the preparation software instruction 277. Optimisation is performed according to the predefined criterion C.

Optimisation comprises the insertion into the diagram of the apparatus 4 a preview of information I4 to be displayed. The preview is compatible with the diagram.

At the conclusion of step e), a set of enriched schematic representations $R_e$ is obtained, each enriched schematic representation $R_e$ comprising a diagram of the apparatus 4 and previews of information I4 to be displayed. The objects O associated with the interest points P chosen by the user on the enriched image $I_e$ are superimposed on each enriched schematic representation $R_e$.

The method then comprises a step f) of classifying enriched schematic representations $R_e$ according to the predefined criterion C.

In practice, the classification orders the enriched schematic representations $R_e$ according to the command and/or information requested by the user.

At the conclusion of this classification, the method is capable of determining the best enriched schematic representation $R_e$.

Step f) is implemented by the classification software instruction 278.

Several embodiments are provided for implementing steps e) and f), notably simultaneously.

According to a first embodiment, for insertion into the preview diagram of information I4 to be displayed, optimisation step e) includes, for example, the use of an associative array. Such an array includes all the interest points P of the apparatus 4 and associates with each interest point P a text value, such as a URI (Uniform Resource Identifier) character string. The URI indicates a resource, such as the preview of information to be displayed. Such a preview of information is, for example, a SCADA mimic diagram or a man-machine interface or an Internet page. In other words, the array associates with each interest point P the unique preview of information $I_P$.

During optimisation, the user chooses the most relevant interest point P for a certain diagram. The preparation software instruction 277 extracts the preview, via the associative array, and proceeds to insert such preview into the diagram in question.

According to a second embodiment, step e) of optimisation includes the use of at least one selection filter.

Each selection filter is, for example, an LDAP (Lightweight Directory Access Protocol) filter.

The LDAP filters make it possible to obtain data structured according to a hierarchical tree.

An LDAP filter is, for example, an approximation filter. A query of the type 'name the spelling of which is close to Peter' is an illustration of an approximation filter.

According to another example, an LDAP filter is an equality filter, i.e. a query of the type 'is exactly equal to Peter'.

According to yet another example, an LDAP filter is a comparison filter or a logical operation of the AND, OR, exclusive OR type, etc.

Each LDAP filter is usually expressed by a syntax appropriate to the filter.

During optimisation, the screen 24, using the touch sensor 214, displays a touch keyboard. The user enters a syntax that corresponds to an LDAP filter.

As a variant, the screen 24 displays touch buttons corresponding to the LDAP filters. The user selects the desired filter.

The preparation software instruction 277 extracts only the interest points P which are associated with such a filter. Then, an associative array associates a text value, such as an URI character string, with each interest point P identified by the LDAP filter. A URI, or Uniform Resource Identifier, is a short character string identifying a physical or abstract resource on a network (e.g. a Web resource), the syntax of which complies with an Internet standard set up for the World Wide Web.

As explained above, the URI indicates a preview. The user may thus choose the most relevant interest point P for a certain diagram. The preparation software instruction 277 extracts the preview, via the associative array, and proceeds to insert such preview into the diagram in question.

The use of LDAP filters can be used to select multiple interest points P.

In a further variant, step e) of optimisation includes an ordering of information displayed in the form of a lattice. Such an ordering is performed, for example, using Formal Concept Analysis, more commonly known under the acronym FCA.

An FCA analysis sets out to study concepts when the concepts are formally described, i.e. the context and the concepts are fully and precisely defined. Such an analysis was introduced by Rudolf Wille in 1982 as a software instruction in lattice theory. It is recalled that a concept may be defined by its intension and its extension: the extension is the set of objects that belong to the concept while the intension is the set of attributes shared by these objects.

Consequently, FCA analysis is a set of data analysis techniques the objective of which is to identify groupings of objects or attributes, also called formal concepts.

FCA analysis is based on lattices which are, in mathematics, a partially ordered set in which each pair of elements has an upper bound and a lower bound.

Each FCA analysis technique is based on the use of an array associating the formal concepts considered with each object and attributes. After the analysis is implemented, a lattice is output the elements of which are ordered.

In the particular case of step e), the object of a formal concept is an object present in the augmented reality view, whilst the attribute of a formal concept is a URI character string indicating a preview.

Alternatively, the attribute is a property of the object present in the augmented reality view or a property of the graphical object.

As explained previously, in the example illustrated, the object is an interest point P, such that the set of chosen interest points P is an input taken into account in the FCA analysis.

Implementation of the FCA analysis creates the array that comprises the interest points P and the corresponding previews. As one interest point P may be associated with multiple previews, the FCA analysis defines the lattice and orders the formal concepts in the lattice. In practice, via the lattice, the analysis provides the preview which is the most appropriate.

Thus, the use of FCA analysis makes it possible to present the ordered previews to the user. Notably, the FCA analysis is used to express filters of the type 'at least X and at most Y' and to present views whereof the relationships are not 'encoded' and therefore known in advance.

The preparation software instruction 277 then extracts this preview and proceeds to insert such preview into the diagram in question.

The method then includes a step h) of displaying enriched schematic representations $R_e$ ordered according to the value of the predefined criterion C. Step h) is implemented by the preview software instruction 279 and the display unit 22. The user may then select the enriched schematic representation $R_e$ that they consider most appropriate to their requests. The enriched schematic representation $R_e$ selected is then displayed on the screen 24, with the aid of the display unit 22.

Figure 8:
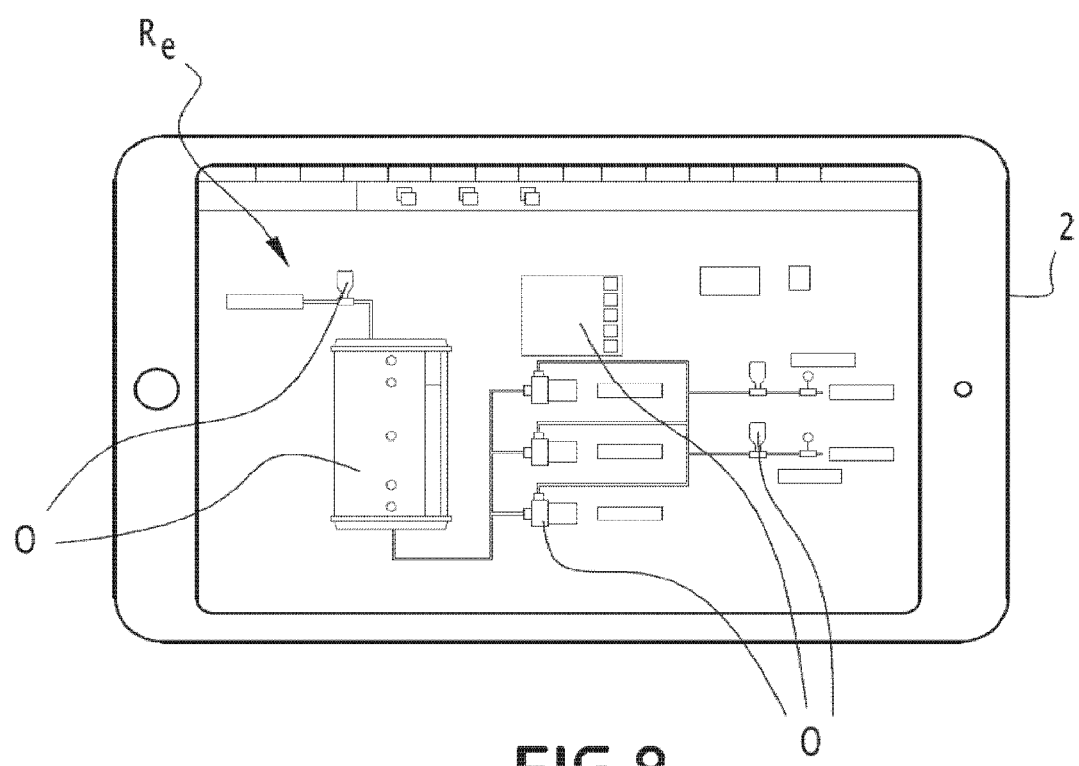
FIG. 8 is a schematic view of the result obtained after a display of an enriched schematic representation.

For example, as represented in FIG. 8, the user selects the enriched schematic representation $R_e$ presenting the highest value of the predefined criterion C. This enriched schematic representation $R_e$ comprises a two-dimensional diagram and a preview of the components of the apparatus 4. In particular, seen on the enriched schematic representation $R_e$ are the pumps 42 and the pipes 40, as well as the objects O associated with the interest points P of the enriched image $I_e$.

In the event that the enriched schematic representation $R_e$ is an Internet page, the preview software instruction 279 can be used to consult a web browser. In the event that the enriched schematic representation $R_e$ chosen is a man-machine interface or a mimic diagram, the preview software instruction 279 can be used to execute a specific software instruction capable of displaying the interface or the mimic diagram in question.

In addition, the display management method comprises steps for changing from displaying in conventional mode to displaying in augmented reality. These later steps are not represented in the figures and will be explained in the following description.

In practice, following a user's action, e.g. a rotation of 90° of the electronic device 2 about the normal axis X2 or pressing an actuation button or a touch button, the user may trigger a conversion of the enriched schematic representation $R_e$ into an enriched image $I_e$ or into a succession of enriched images of the display in augmented reality.

The display unit 22 then displays on the screen 24 a touch button enabling the user to select one portion of the enriched schematic representation $R_e$. In particular, the user must select a portion comprising at least one object O. In the example, the user selects the desired portion of the enriched schematic representation $R_e$ which comprises multiple objects O.

As a variant, the user selects the entire enriched schematic representation $R_e$.

Then, using the execution software instruction 275, the method identifies the interest points P associated with the objects O selected.

The method then comprises a conversion of the selected portion or the entire enriched schematic representation $R_e$ into a new enriched image $I_e$ or into a new succession of enriched images.

As described previously, the electronic device 2 identifies, via the server 6, the apparatus 4 by geopositioning, by image recognition, using a unique code or any other mechanism for uniquely identifying the apparatus 4. The electronic device 2 calculates, using the set of sensors 21, its GPS coordinates, its orientation, and the relative position of the detector 20. In other words, at the conclusion of this step, the display management method has enabled the environment in which the electronic device 2 is located to be recognised.

Then, the computer program product 27 locates and displays on an image of the apparatus 4, or a succession of images, the interest points P identified.

More precisely, the method locates interest points P, displays interest points P if the interest points P are located in the portion of enriched schematic representation $R_e$ selected or indicates their relative position and guides the user to find them when the interest points P do not belong to the portion of enriched schematic representation $R_e$ selected.

As a variant, when the new enriched image $I_e$ or the new succession of images does not correspond to the selected portion or to the entire enriched schematic representation $R_e$ and when the interest points P are not directly visible on the image $I_e$, the computer program product 27 displays on the screen 24 markers indicating the relative position of the interest points P.

The display management method is suitable for performing a fluid and smooth transition between the display in augmented reality and the display in conventional mode. The method can be used to search for the correct visual interface in the mode selected by the user. The method then presents the interface or a list of interfaces with an ordered matching rate. When there are multiple satisfactory interfaces, the user chooses the most appropriate interface.

The user may thus find the same information in the two displays. The first augmented reality display corresponds to a geographical and real space whereas the second display in conventional mode corresponds to a professional view, i.e. a logical and abstract space more easily intelligible to the user.

Thus, the display management method is a tool for the user to obtain a display in conventional mode, for performing a more simplified, schematic and effective analysis of the information identified. The display management method as described above may be used in an industrial environment, such as the pumping station 4, as well as in non-industrial environments, e.g. an environment in which a tertiary activity is practised or a hospital environment.

The invention claimed is:

1. A method for managing display on a screen of an electronic device of at least one item of information relating to an apparatus, the method comprising:
   providing an enriched image of the apparatus, comprising an image of the apparatus and of interest points of the apparatus, each interest point being associated with an item of information specific to an element of the apparatus,
   choosing at least one interest point from among the plurality of interest points, for obtaining a set of chosen interest points,
   selecting information to be displayed, the information to be displayed being information associated with the chosen interest points,
   providing a set of diagrams of the apparatus available for the apparatus,
   optimizing, according to a predefined criterion, each diagram of the apparatus available by inserting into the diagram of the apparatus a preview of information to be displayed, the preview being compatible with the diagram, for obtaining an enriched schematic representation comprising a diagram of the apparatus and at least one preview of one of the items of information to be displayed, and
   classifying the enriched schematic representations according to the predefined criterion,
   wherein at least one of: the providing the enriched image, the choosing the at least one interest point, the selecting the information to be displayed, the providing the set of diagrams, the optimizing each diagram, and the classifying the enriched schematic representations is triggered by an action of a user, and
   wherein the action of the user is a rotation of the electronic device about an axis perpendicular to the screen.

2. The method according to claim 1, comprising:
selecting data, the data not being information associated with the chosen interest points and the data being accessible for the electronic device, information to be displayed also including the selected data.

3. The method according to claim 2, in which the selected data originate from at least one sensor of the electronic device.

4. The method according to claim 1, in which the optimizing includes an ordering of information to be displayed in the form of a lattice.

5. The method according to claim 1, in which the optimizing includes the use of selection filters.

6. The method according to claim 1, in which the optimizing includes the use of an associative array associating with each interest point the unique preview of information with which the interest point is associated.

7. The method according to claim 1, further comprising:
displaying enriched schematic representations ordered according to the value of the predefined criterion.

8. The method according to claim 7, further comprising:
displaying the enriched schematic representation presenting the highest value of the predefined criterion.

9. The method according to claim 1, wherein the action of the user is further pressing an actuation button or a touch button of the electronic device.

10. A non-transitory computer readable medium having stored thereon a program that when executed by the computer causes the computer to implement a method for managing the display on a screen of an electronic device of at least one item of information relating to an apparatus, the method comprising:
providing an enriched image of the apparatus, comprising an image of the apparatus and of interest points of the apparatus, each interest point being associated with an item of information specific to an element of the apparatus,
choosing at least one interest point from among the plurality of interest points, for obtaining a set of chosen interest points,
selecting information to be displayed, the information to be displayed being information associated with the chosen interest points,
providing a set of diagrams of the apparatus available for the apparatus,
optimizing, according to a predefined criterion, each diagram of the apparatus available by inserting into the diagram of the apparatus a preview of information to be displayed, the preview being compatible with the diagram, for obtaining an enriched schematic representation comprising a diagram of the apparatus and at least one preview of one of the items of information to be displayed, and
classifying the enriched schematic representations according to the predefined criterion,
wherein at least one of: the providing the enriched image, the choosing the at least one interest point, the selecting the information to be displayed, the providing the set of diagrams, the optimizing each diagram, and the classifying the enriched schematic representations is triggered by an action of a user, and
wherein the action of the user is a rotation of the electronic device about an axis perpendicular to the screen.

11. An electronic device comprising:
a screen; and
processing circuitry configured to
provide an enriched image of the apparatus, comprising an image of the apparatus and of interest points of the apparatus, each interest point being associated with an item of information specific to an element of the apparatus,
choose at least one interest point from among the plurality of interest points, for obtaining a set of chosen interest points,
select information to be displayed, the information to be displayed being information associated with the chosen interest points,
provide a set of diagrams of the apparatus available for the apparatus,
optimize, according to a predefined criterion, each diagram of the apparatus available by inserting into the diagram of the apparatus a preview of information to be displayed, the preview being compatible with the diagram, for obtaining an enriched schematic representation comprising a diagram of the apparatus and at least one preview of one of the items of information to be displayed, and
classify the enriched schematic representations according to the predefined criterion,
wherein at least one of: the providing the enriched image, the choosing the at least one interest point, the selecting the information to be displayed, the providing the set of diagrams, the optimizing each diagram, and the classifying the enriched schematic representations is triggered by an action of a user, and
wherein the action of the user is a rotation of the electronic device about an axis perpendicular to the screen.

* * * * *